US012585982B2

(12) United States Patent (10) Patent No.: US 12,585,982 B2
Lee et al. (45) Date of Patent: Mar. 24, 2026

(54) MODEL MANAGEMENT USING CONTAINERS

(71) Applicant: STRIPE, INC., South San Francisco, CA (US)

(72) Inventors: Hsien-Chiao Lee, Chino, CA (US); Jonathan Bender, Truckee, CA (US)

(73) Assignee: STRIPE, LLC, South San Francisco, CA (US)

( * ) Notice: Subject to any disclaimer, the term of this patent is extended or adjusted under 35 U.S.C. 154(b) by 1154 days.

(21) Appl. No.: 17/450,353

(22) Filed: Oct. 8, 2021

(65) Prior Publication Data

US 2023/0111775 A1 Apr. 13, 2023

(51) Int. Cl.
*G06F 17/00* (2019.01)
*G06N 20/00* (2019.01)

(52) U.S. Cl.
CPC .................................... *G06N 20/00* (2019.01)

(58) Field of Classification Search
CPC ......... G06N 20/00; G06F 8/60; G06F 9/5038; G06F 9/5011
USPC .......................................................... 706/12
See application file for complete search history.

(56) References Cited

U.S. PATENT DOCUMENTS

| | | | |
|---|---|---|---|
| 11,593,704 B1 * | 2/2023 | Jenatton | G06F 16/958 |
| 11,797,876 B1 * | 10/2023 | Wang | G06N 3/0464 |
| 2021/0117859 A1 * | 4/2021 | Rogers | G06F 8/65 |
| 2022/0083363 A1 * | 3/2022 | Lewis | H04L 67/34 |
| 2022/0292303 A1 * | 9/2022 | Cao | G06F 9/505 |
| 2024/0281242 A1 * | 8/2024 | Shinohara | G06F 8/65 |

* cited by examiner

*Primary Examiner* — Jason T Edwards
(74) *Attorney, Agent, or Firm* — Foley & Lardner LLP

(57) ABSTRACT

The subject technology receives a first request to deploy a first machine learning model, the first request including information indicating an identifier associated with the first machine learning model. The subject technology determines, based at least in part on the first machine learning model, a set of dependent machine learning models. The subject technology selects a first container environment to deploy the first machine learning model and the set of dependent machine learning models. The subject technology, based on the selected first container environment, executes an instance of an application in the selected first container environment, the first machine learning model and the set of dependent machine learning models being deployed as part of the instance of the application.

20 Claims, 10 Drawing Sheets

700

RECEIVE A FIRST REQUEST TO DEPLOY A FIRST MACHINE LEARNING MODEL
702

DETERMINE, BASED AT LEAST IN PART ON THE FIRST MACHINE LEARNING MODEL, A SET OF DEPENDENT MACHINE LEARNING MODELS
704

SELECT A FIRST CONTAINER ENVIRONMENT TO DEPLOY THE FIRST MACHINE LEARNING MODEL AND THE SET OF DEPENDENT MACHINE LEARNING MODELS
706

EXECUTE AN INSTANCE OF AN APPLICATION IN THE SELECTED FIRST CONTAINER ENVIRONMENT, THE FIRST MACHINE LEARNING MODEL AND SET OF DEPENDENT MACHINE LEARNING MODELS BEING DEPLOYED AS PART OF THE INSTANCE OF THE APPLICATION
708

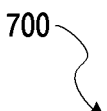

700

RECEIVE A FIRST REQUEST TO DEPLOY A FIRST MACHINE LEARNING
MODEL
702

DETERMINE, BASED AT LEAST IN PART ON THE FIRST MACHINE
LEARNING MODEL, A SET OF DEPENDENT MACHINE LEARNING MODELS
704

SELECT A FIRST CONTAINER ENVIRONMENT TO DEPLOY THE FIRST
MACHINE LEARNING MODEL AND THE SET OF DEPENDENT MACHINE
LEARNING MODELS
706

EXECUTE AN INSTANCE OF AN APPLICATION IN THE SELECTED FIRST
CONTAINER ENVIRONMENT, THE FIRST MACHINE LEARNING MODEL
AND SET OF DEPENDENT MACHINE LEARNING MODELS BEING
DEPLOYED AS PART OF THE INSTANCE OF THE APPLICATION
708

FIG. 7

800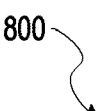

GENERATE A FIRST IDENTIFIER ASSOCIATED WITH THE FIRST MACHINE LEARNING MODEL, THE FIRST IDENTIFIER INDICATING A PARTICULAR VERSION OF THE FIRST MACHINE LEARNING MODEL
802

UPDATE MODEL REGISTRY BASED ON THE GENERATED FIRST IDENTIFIER AND MODEL TAG TO ASSOCIATE THE FIRST MACHINE LEARNING MODEL WITH THE FIRST CONTAINER ENVIRONMENT WHERE THE FIRST MACHINE LEARNING MODEL IS DEPLOYED
804

FIG. 8

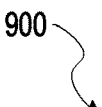

900

RECEIVE A SECOND REQUEST, THE SECOND REQUEST COMPRISING AT LEAST ONE OPERATION FOR FIRST MACHINE LEARNING MODEL TO PERFORM
902

QUERY A MODEL REGISTRY TO LOCATE INFORMATION RELATED TO THE FIRST MACHINE LEARNING MODEL
904

RECEIVE THE INFORMATION RELATED TO THE FIRST MACHINE LEARNING MODEL, THE INFORMATION INCLUDING FIRST IDENTIFIER ASSOCIATED WITH THE FIRST MACHINE LEARNING MODEL
906

BASED ON THE FIRST IDENTIFIER, ROUTE THE SECOND REQUEST TO FIRST CONTAINER ENVIRONMENT FOR FIRST MACHINE LEARNING MODEL TO PERFORM THE AT LEAST ONE OPERATION
908

SEND A THIRD REQUEST TO PERFORM THE AT LEAST ONE OPERATION UTILIZING THE FIRST MACHINE LEARNING MODEL INCLUDED IN THE INSTANCE OF THE APPLICATION THAT IS EXECUTING IN THE FIRST CONTAINER ENVIRONMENT
910

RECEIVE INFORMATION INCLUDING A RESULT OF PERFORMING THE AT LEAST ONE OPERATION
912

FIG. 9

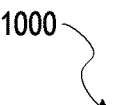
1000
DETECT THAT A DIFFERENT INSTANCE OF FIRST MACHINE LEARNING MODEL IS INCLUDED IN A DIFFERENT CONTAINER ENVIRONMENT FROM THE FIRST CONTAINER ENVIRONMENT
1002
CEASE EXECUTION OF THE DIFFERENT CONTAINER ENVIRONMENT AND THE DIFFERENT INSTANCE OF THE FIRST MACHINE LEARNING MODEL
1004
FIG. 10

MODEL MANAGEMENT USING CONTAINERS

TECHNICAL FIELD

The subject matter disclosed herein generally relates to the technical field of machine learning models utilized in a network-based computing environment.

BACKGROUND

The present subject matter seeks to address technical problems that exist in developing and deploying machine learning models.

BRIEF DESCRIPTION OF THE DRAWINGS

Some embodiments are illustrated by way of example and not limitation in the figures of the accompanying drawings.

FIG. 7 is a flow diagram illustrating a method, in accordance with some embodiments of the present disclosure.

FIG. 8 is a flow diagram illustrating a method, in accordance with some embodiments of the present disclosure.

FIG. 9 is a flow diagram illustrating a method, in accordance with some embodiments of the present disclosure.

FIG. 10 is a flow diagram illustrating a method, in accordance with some embodiments of the present disclosure.

DETAILED DESCRIPTION

Figure 1:
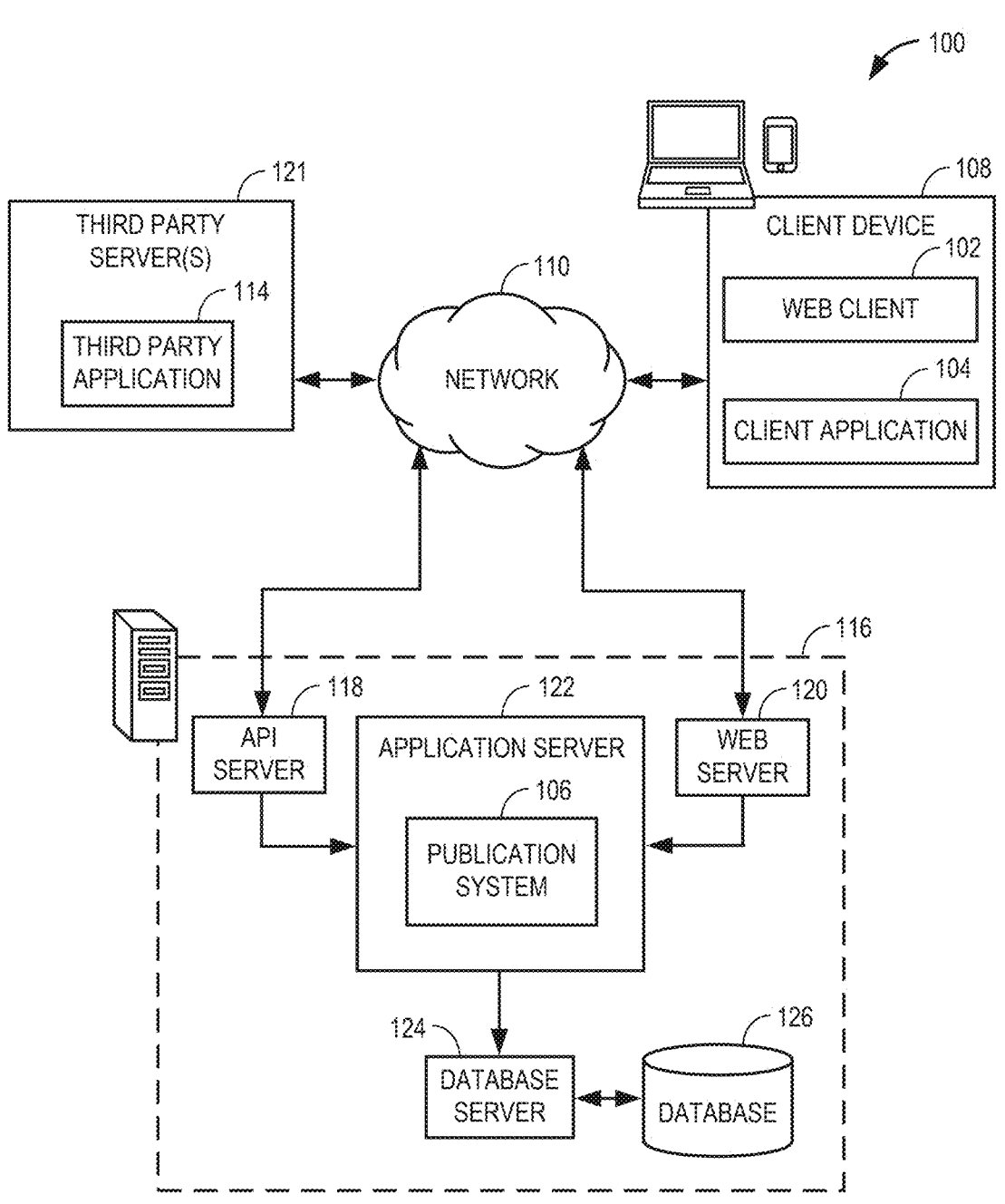
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Utilization of container technologies in computing has increased and has become a popular way of virtualizing applications. Moreover, containers are a lightweight, agile, and powerful solution to deploy software applications.

Machine learning (ML) has seen a rise in popularity in recent years due to the availability of massive amounts of training data, and advances in more powerful and efficient computing hardware. Machine learning may utilize models that are executed to provide predictions (e.g., fraud detection) in particular applications among many other types of applications.

A machine learning lifecycle may include the following distinct stages: data collection, annotation, exploration, feature engineering, experimentation, training, evaluation, and deployment. The machine learning lifecycle can be iterative from data collection through evaluation. At each stage, any prior stage could be revisited, and each stage can also change the size and shape of the data used to generate the ML model.

Existing systems for deploying and running machine learning models can support various phases of the development lifecycle, such as model training, experimentation, evaluation, and deployment. Such systems can utilize various data management systems, such as cloud storage services, distributed file systems, or other database solutions, each of which can vary in the steps to access and utilize by users. Thus, computing environments utilized by users (e.g., developers) are often provided in a distributed computing environment in which one or more cloud services and platforms are leveraged.

In an experimental development process (e.g., where machine learning models are often updated), it can be beneficial that an efficient and effective computing environment is provided where machine learning models when updated can be deployed with relative ease without further burdening users (e.g., developers). Existing systems may not be well designed for efficient deployment of machine learning models with dependencies on other machine learning models.

Moreover, when machine learning models fail or crash, such existing systems lack isolation between such models that may result in numerous or extraneous re-deployments of machine learning models which consume a high proportion of available computing resources. For example, in a given deployment where (all) machine learning models are executing in a single cluster, a single model that fails or crashes has the potential to take down the remaining models. In addition, loading all models in a single cluster can requires techniques such as sharding the models and its dependencies across computing nodes, adding significant complexity to a system. Consequently, the deployment time for a given machine learning model could increase, driving up the costs for development while also increasing utilization of computing resources. Additionally, such systems also may not prove to be scalable as a number of users increases.

As discussed herein, the phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node.

Implementations of the subject technology improve the computing functionality of a given electronic device by 1) de-coupling deployment of a machine learning model from a local client machine to a computing environment with more resources thereby reducing development time and local workloads, 2) providing a more secure computing environment afforded by a container (e.g., process isolation) that serves as a host for executing the model, and 3) providing a quicker and easier way for scaling the deployment of machine learning models as more users are involved in the development or as the complexity of the model increases. These benefits therefore are understood as improving the computing functionality of a given electronic device, such as an end user device which may generally have less computational and/or power resources available than, e.g., one or more cloud-based computing nodes or servers.

A networked system, as described by embodiments herein, provides a computing environment for faster deployment of machine learning models. In example embodiments, the subject system utilizes container technology, such as a container platform, that allows several containers to run on the same host or virtual machine, each of which is a separate virtual environment or application. Further, in an example, a computing service (e.g., web service and the like) can deploy a machine learning model to a container for use in a given application.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at stripe.com by Stripe, Inc. of San Francisco, Calif. (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 121, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
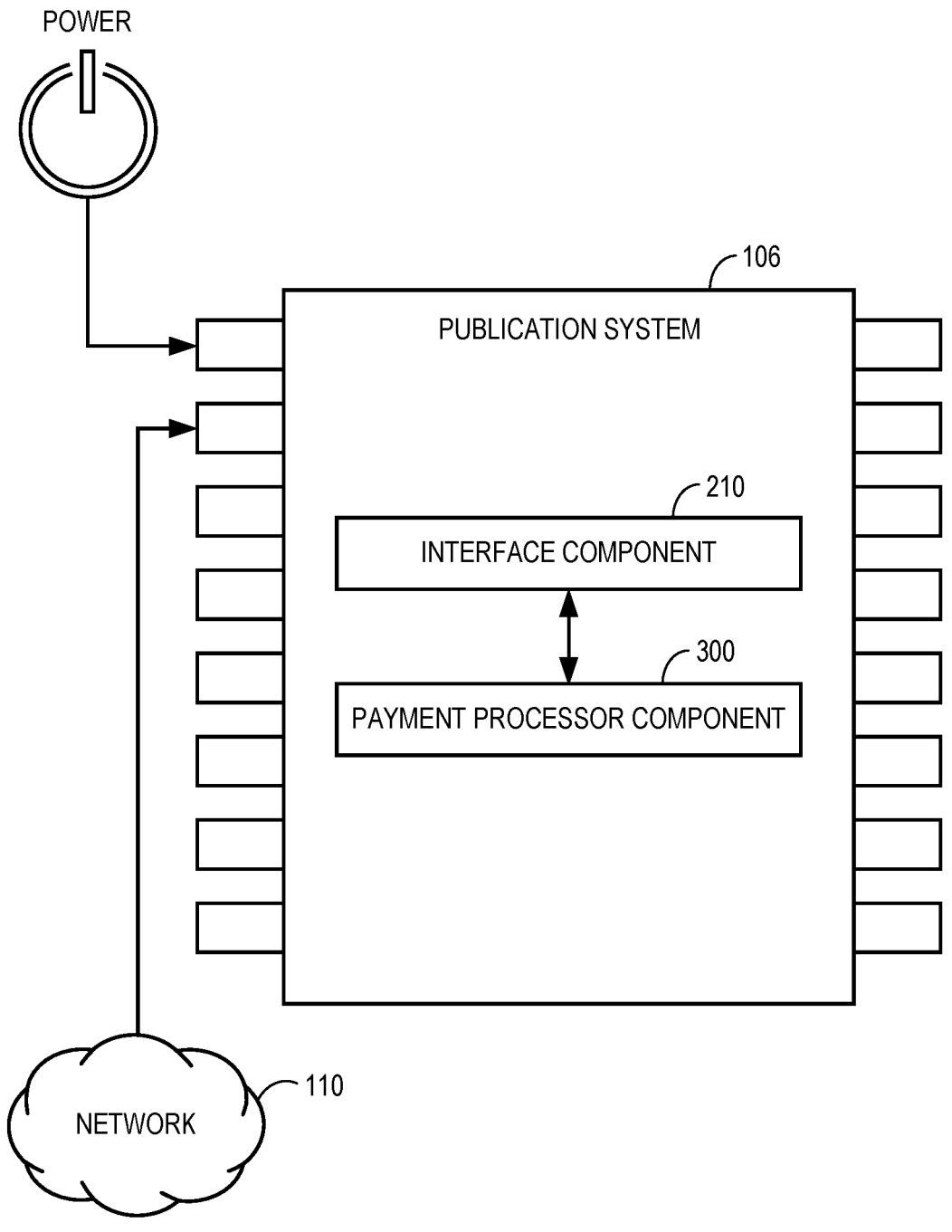
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
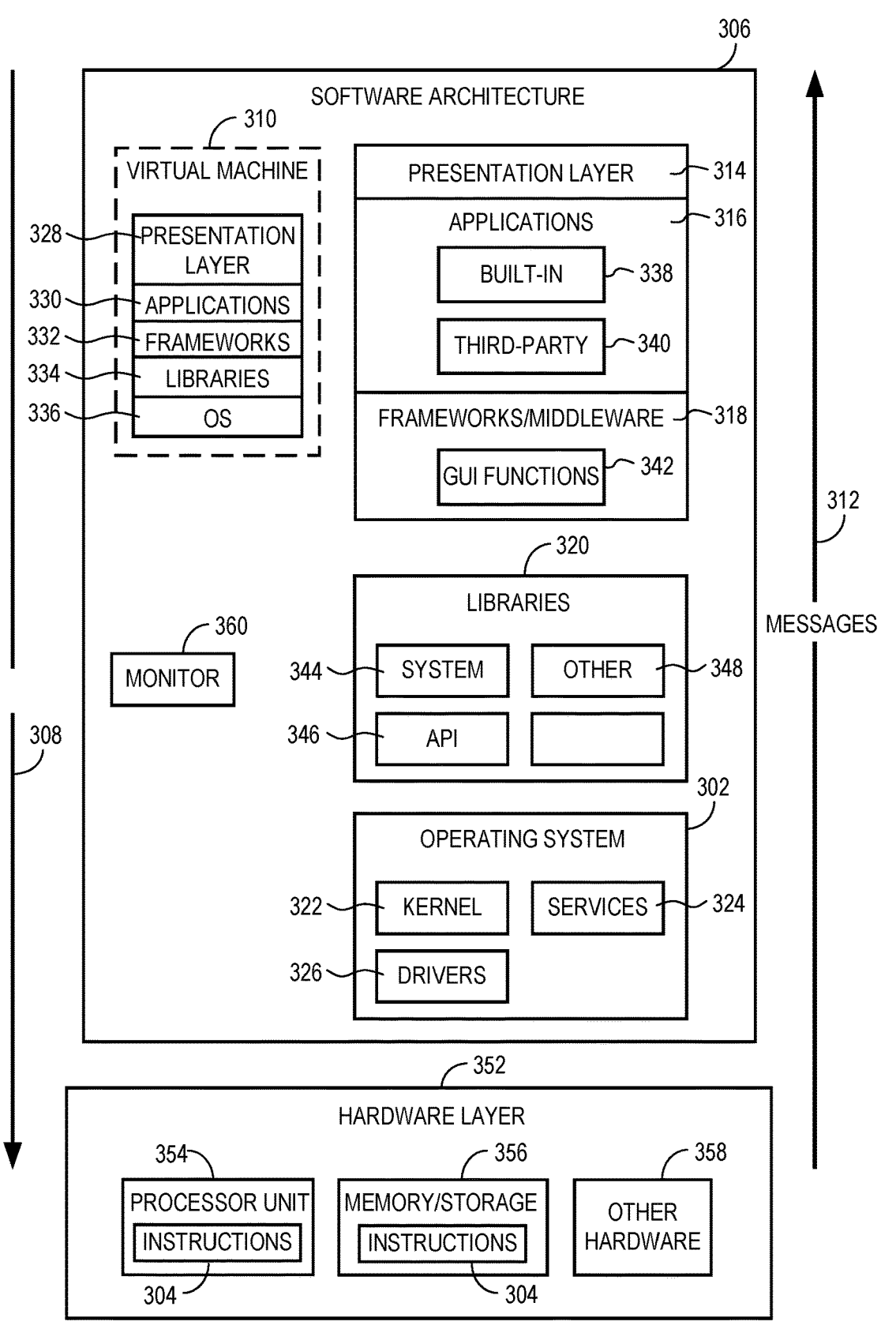
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer

314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
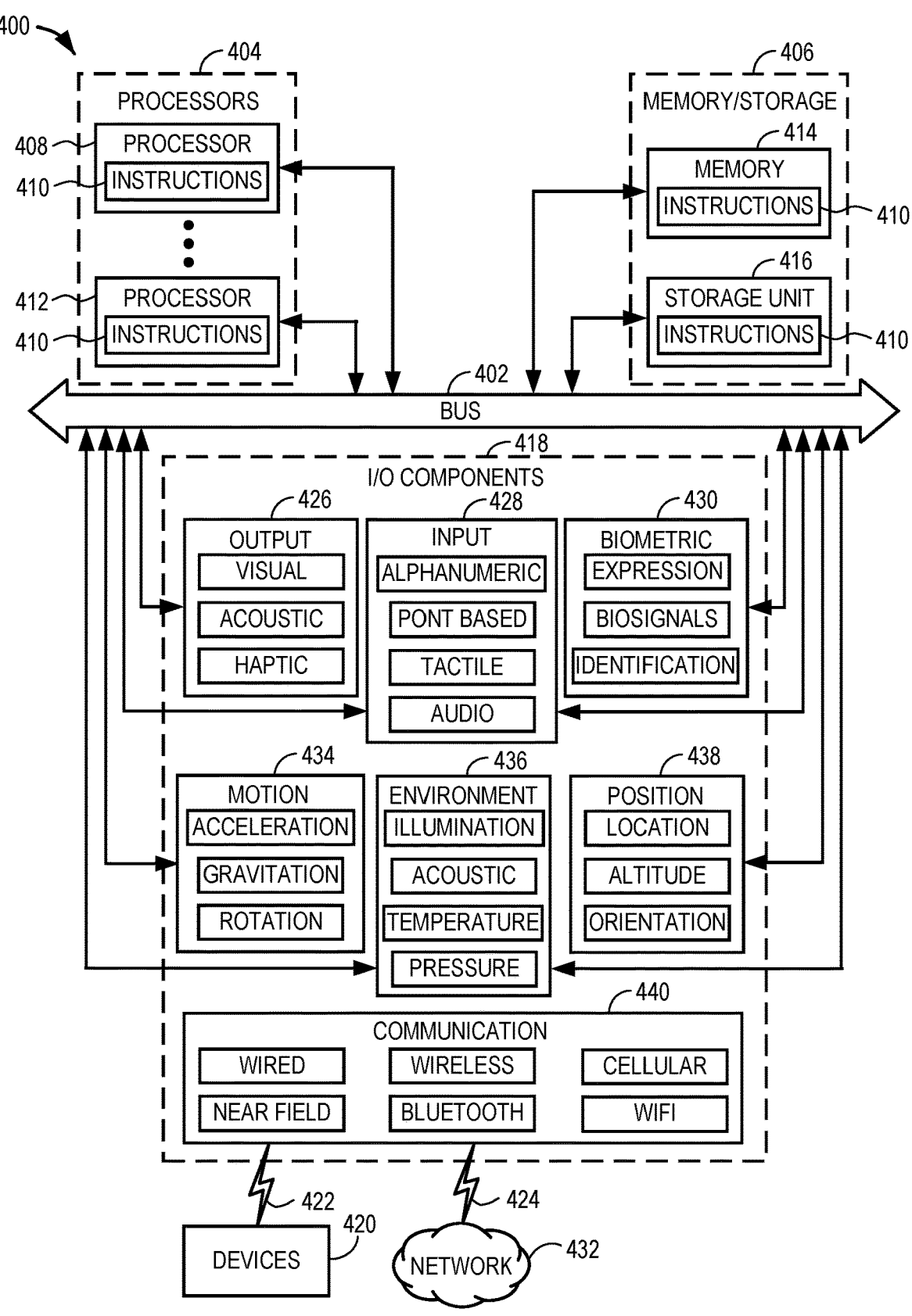
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Figure 5:
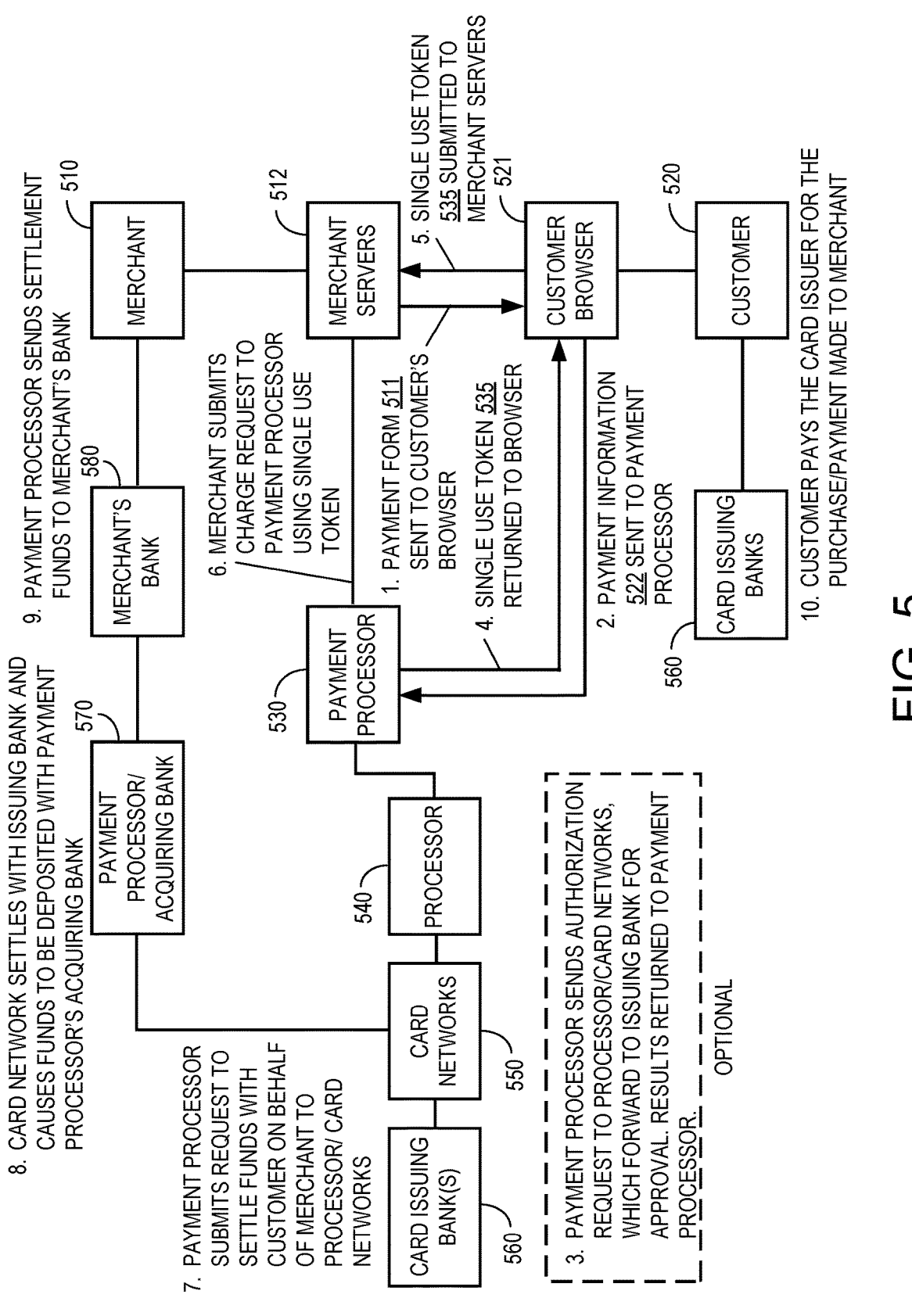
FIG. 5 is a block diagram showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JavaScript library—enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.

2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.

4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.

5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.

6. The merchant 510 uses the single-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.

7. The payment processor 530 settles the charge on behalf of the merchant 510 with the processor 540 or directly with the card network 550.

8. The card network 550 causes the funds to be paid by the card issuing bank 560 to the payment processor 530 or to the payment processor's acquiring bank 570.

9. The payment processor 530 causes the settled funds to be sent to the merchant 510 (or to the merchant's bank 580), net of any applicable fees.

10. The card issuing bank 560 collects the paid funds from the customer 520.

Not all of the steps listed above need happen in real time. Other examples, arrangements, and functionality are possible. Applicant's issued U.S. Pat. No. 9,830,596 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

Embodiments of the subject technology advantageously provide more efficient approaches and techniques for deploying machine learning models that can drastically reduce a number of steps that a given user (e.g., a developer) is required to perform in order to deploy a machine learning model in a secure manner. Machine learning models can utilize vast amounts of data, including training data. In an example where the model is providing predictions, a goal of model development is to ensure that such predictions are accurate in most instances (or within a margin that is tolerated based on the user's expected standards, design specification, tolerances, and the like) such that the model can be eventually deployed in a commercial environment or application.

Such massive amounts of data has increased the adoption of distributed development environments where cloud platforms and resources are often utilized by client devices to perform certain tasks (e.g., for storing training data, for executing models that consume such data, and the like). Compared with existing and previous approaches for deploying machine learning models, the subject system described in embodiments herein implements a better integration with a container platform. The container platform described herein provides containers that enable quicker development of machine learning models by dynamically utilizing cloud resources and ensuring security of the data. In comparison with virtualization platforms where virtual machines (e.g., virtualizing an entire machine or hardware architecture) may be utilized for performing tasks, the container platform offers a more lightweight approach by virtualizing, in an example, a given operation system (instead of the entire hardware architecture underneath).

In particular, containers virtualize at the application layer (instead of virtualizing at the hardware level like a virtual machine), and can utilize one machine, share an operating system kernel, and virtualize an operating system to run processes that are isolated. Consequently, the container platform described herein offers a more advantageous approach to machine learning development as containers are more lightweight compared to virtual machines, and are easier to manage and started for performing tasks (e.g., deploying a model) for a given machine learning model.

Moreover, in existing systems, when a given machine learning model (e.g., where such a model is executing outside of a container environment) encounters an error (or suffers from a bug) during execution, the machine learning model can cause a failure or instability (e.g., memory leak, application crash, segmentation fault, etc.) in its execution environment (e.g., server or machine). In such an instance, another model that is executing in the same execution environment may not execute properly as a particular computing resource(s) (e.g., memory, processor, network bandwidth, and the like) may have been exhausted as a result of the failure (or erroneous operations) of the machine learning model. As described herein, embodiments of the subject technology address this by at least deploying and executing a machine learning model(s) in a given container environment (e.g., pod or container) that provides at least computing resource (e.g., memory, CPU, and the like) isolation from other machine learning models and thereby improving the functionality of a computer by providing improved memory protection and ensuring the integrity of the executing environment even in the event of a failure caused by an errant or malfunctioning (e.g., buggy) model.

In an example, each model can also have different memory requirements along with exhibiting different characteristics with respect to a number of requests that are received (e.g., request(s) received from a requesting party such as an application(s) or service(s) that utilizes the functionality of the model such as a prediction operation). In comparison with existing approaches where a new server or machine is utilized when a particular model is deployed and executed, embodiments of the subject technology therefore improve the functionality of a computer by deploying machine learning models into respective container environments (e.g., pods or containers) where each container environment can utilize different amounts of computing resources (e.g., memory, storage, network bandwidth, storage, and the like) based at least in part on the requirements of a particular machine learning model(s) within that same container environment and thereby more efficiently utilize available computing resources to meet such requirements (along with avoiding utilizing additional machines or servers necessitated from an inefficient allocation of resources). In an example, another benefit due to such improvements in allocating resources is that a given model may be replicated (e.g., for redundancy to support scalability of such a model as a number of users increase) a greater number of times based on the available resources (or available servers or machines) thereby improving at least the scalability and load balancing of the subject system.

In addition, due to the iterative nature of machine learning model development, it can be expected that a given model is updated over time (e.g., upon being re-trained with new training data). However, in some existing systems, updating such a model can be difficult due to a dependency on other models, and requiring extensive configuration knowledge of the model and its dependent models or customization of configuration data when an update to the model occurs and the updated model is deployed. Moreover, outdated models may still be executing within such a legacy system even after updated models are deployed. In some existing systems, sending a request to a particular machine learning model can require knowing the exact location of a server or machine where the model is executing, which can be difficult in a distributed computing environment that includes multiple computing nodes or servers. Embodiments of the subject technology provide improvements to the functionality of a computer by enabling automatic routing (that is transparent to a requesting party or user that originate such requests) of such requests to the appropriate model in a given cluster or computing node that ensures that such requests are not lost or not processed. Also, embodiments of the subject technology can automatically perform shutdown of outdated models, after updated models are deployed, without requiring explicit instructions or requests which also improves the functionality of a computer by releasing computing resources and increasing the amount of available computing resources in the subject system.

Figure 6:
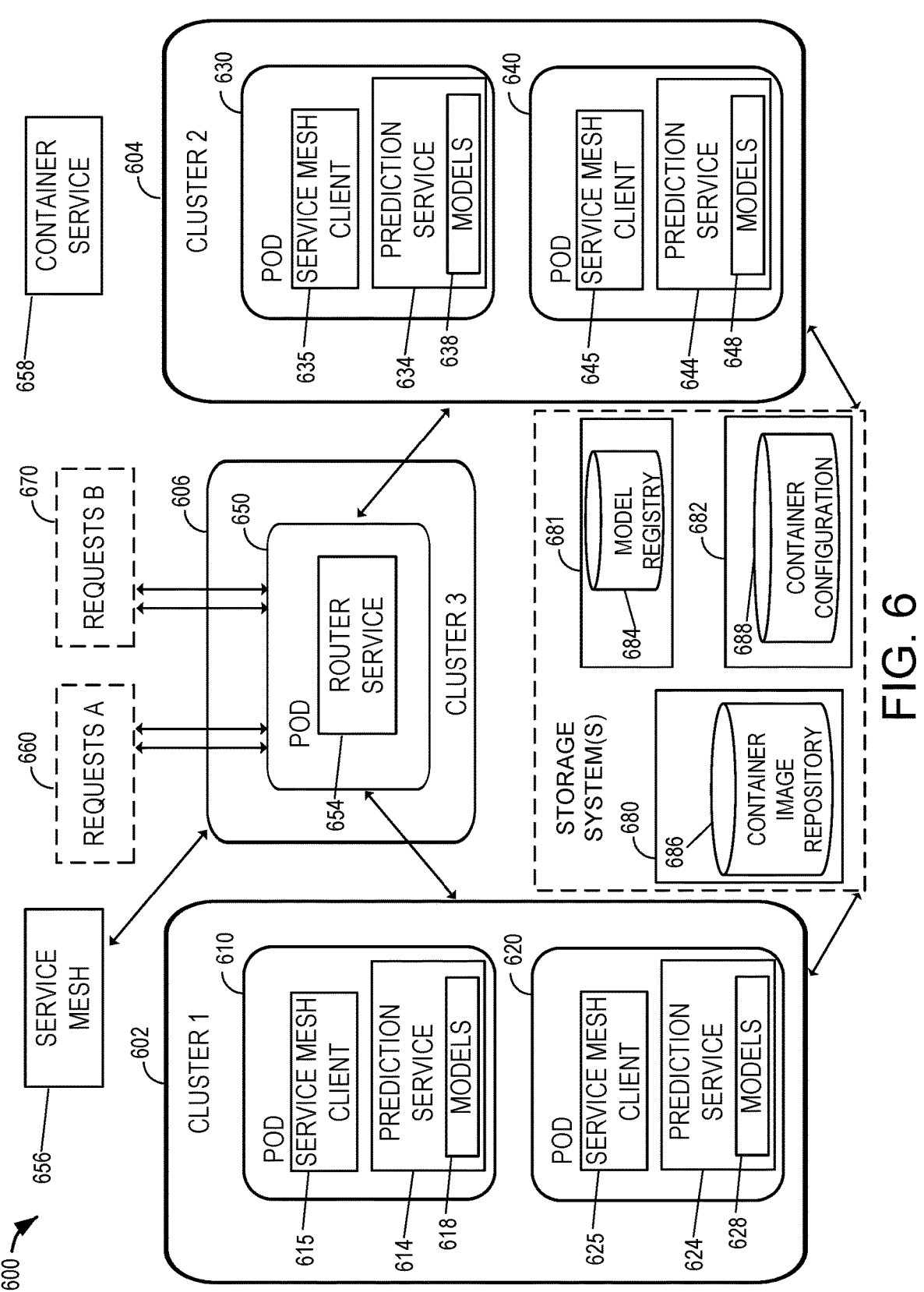
FIG. 6 is a conceptual illustration of a block diagram of a system for deploying machine learning models using containers, in accordance with some embodiments of the present disclosure.

FIG. 6 is a conceptual illustration of a block diagram of a system 600 for deploying machine learning models using containers, in accordance with some embodiments of the present disclosure.

As illustrated in FIG. 6, the system 600 includes cluster 602, cluster 604, and cluster 606. Each cluster can be understood as representing a set of (hardware) computing nodes that are worker machines, and each cluster can include at least one computing node to execute and perform operations for one or more applications deployed from a container image. In an embodiment, the models are stored as compressed (e.g., zip and the like) package files stored in the cloud (e.g., Amazon S3). The container image contains an HTTP service (e.g., Finagle Scala) and loads the model on runtime.

In an example, a user or developer can declaratively describe dependencies in a container image configuration file (e.g., a text document that contains the commands a user can call to generate a container image, where a container image refers to an executable package that contains data, source code, libraries, dependencies, tools, and other files for an application to execute). Such a container image configuration file can be understood as a script that, when processed, performs operations that generates (e.g., builds) a container image as described, in a declarative manner, in the container image configuration file. As discussed below, a given configuration file can be stored in a storage system and include information related to a given machine learning model and, when applicable, information related to a set of dependent machine learning models of the model. In an example, the subject system defines the image configuration file and not the users. In an embodiment, the configuration file is committed as code. A user can manage the models that are loaded in a given prediction service by updating a model registry and triggering a deployment.

In some embodiments, the subject technology utilizes container images that can be generated and executed by system 600 based at least in part on a container image configuration file that describes a container image including a machine learning model. In an embodiment, a container is immutable such that the container and containerized application (e.g., including the machine learning model) cannot be easily changed when either is executing. Thus, in some existing container platform systems, changes to a containerized application, such as when an included machine learning model is updated (e.g., due to training or re-training) can require generating a new container image which reflects the changes (e.g., the updated model), and subsequently executing as a new container with the changes to the application. In an embodiment, the application and the machine learning models are packaged separately, and both are immutable independently. Additionally, the application container is enabled to load a different machine learning model (e.g., a user retrains a model and generates a new immutable model package, then the user deploys the model, through a different service, and triggers the application to be restarted with the new model package). Further, the same model can be loaded on a different application container in an embodiment.

In an embodiment, a detection of a change in a given machine learning model is triggered by a particular event (e.g., model deployment). In some other embodiments, in the event that changes to the machine learning model are implemented (e.g., due to an update to the application or to the model itself), the subject system can detect such changes and perform additional operations (discussed further below) to ensure a new version of the machine learning model is deployed to a respective container environment. In addition, new requests can be routed to the new version of the machine learning model, and any prior version(s) of the model can be terminated (e.g., cease execution). In this manner, system 600 can facilitate and manage updating models and ensure requests are routed in a proper fashion to newer models while older models are terminated in a safe and expected way.

As illustrated, cluster 602 and cluster 604 are communicatively coupled (e.g., sending and receiving messages and requests, and the like) to cluster 606. In some examples, cluster 602 and cluster 604 are communicatively coupled to a set of storage systems including storage system 680, storage system 681, and storage system 682, and is enabled to send and receive messages to each storage system to perform various operations. For example, storage system 681 provides non-volatile memory which stores, in a persistent manner, model registry 684 that stores information for machine learning models. Storage system 682 includes container configuration 688 that stores configuration information for containers (e.g., container images and applications included therein). As also shown, in this example, storage system 680 includes container image repository 686 that stores container images (e.g., applications and/or machine learning models) for deploying in a container environment(s). Container configuration 688 includes information for at least one machine learning model for a given container image, and may also include information related to one or more dependent models of the machine learning model for the container image. In an embodiment, container configuration(s) can be committed as code (or data) in a code repository (e.g., GIT). In an embodiment, container images and model packages are stored in different storage systems.

In an implementation, one or more of the aforementioned storage systems functions as a centralized storage repository that can be accessed via a network (e.g., LAN, WAN, and the like), and in some instances storage system 680 can be implemented as a distributed storage system in which storage is provided across several (e.g., physical) machines.

In an embodiment, model registry 684 stores information for machine learning models including unique identifiers (IDs), model tags, and the like. In an example, each machine learning model may be assigned a unique ID. A given unique ID for a model can be based on a hash value generated utilizing a hash function or algorithm (secure hash algorithm or SHA, and the like) and a given model tag can be a name, string value, and the like for identifying a model to perform the operation (e.g., prediction) in the request.

In some implementations, the aforementioned unique ID (e.g., based on a given hash algorithm) identifies a particular version of the model that corresponds to, for example, a particular code base during the development of the model. As discussed before, given the experimental nature of developing machine learning models, it is likely that such models are updated as models are trained (or retrained) when new data is received or processed which may affect the accuracy of operations (e.g., predictions, and the like) performed by the models. In this regard, system 600 is enabled to detect a request with a unique ID that corresponds to a new (e.g., updated) version of a given model, and proceed with deploying the new version of the model as discussed further herein.

The following discussion describes embodiments of components that are included in cluster 602 and cluster 604. In the below discussion, reference is made to various pods as container environments but it is understood that a particular pod can instead refer to a single container or multiple containers that execute within a given pod, which is supported by system 600.

As illustrated, cluster 602 and cluster 604 include various pods that include components that facilitate executing applications, including machine learning models, in container environments. In the example of FIG. 1, each cluster (e.g., cluster 602 and cluster 604) includes a set of pods (e.g., pod 610, pod 620, pod 630, pod 640), where each pod includes a prediction service (e.g., prediction service 614, prediction service 624, prediction service 634, prediction service 644), and a set of machine learning models (e.g., models 618, models 628, models 638, models 648). Each of the aforementioned sets of machine learning models can include a single (e.g., standalone) machine learning model, or a machine learning model and its dependent model(s) depending on the configuration of such a model. Each prediction service, in an embodiment, executes within a respective container. As further illustrated, each prediction service includes a particular set of machine learning models. In an embodiment, router service 654 performs operations to deploy the set of machine learning models to a particular container environment (e.g., pod in the cluster) where a particular prediction service is executing.

As further illustrated, cluster 606 includes pod 650 that includes router service 654 to route requests to appropriate pods that can handle such requests as discussed further herein. In an embodiment, router service 654 can communicate with or utilize service mesh 656. In the example of FIG. 6, service mesh 656 can execute within its own container. Service mesh 656 provides a network mesh layer that can connect each cluster (and pod or container therein) and implements a microservice architecture that can organize an application(s) as a collection of services. Moreover, service mesh 656 can be understood as an edge and service proxy that enables access to an application (e.g., a service) in a transparent manner across a cloud architecture (e.g., multiple clusters and pods or containers therein), which may include managing traffic (e.g., requests and the like) and routing the traffic to such an application or service. In this manner, router service 654 can utilize service mesh 656 to forward requests (e.g., when involving a particular machine learning model(s)) to an appropriate prediction service.

In some embodiments, router service 654 receives requests 660 and requests 670. In an example, requests 660 are related to requests involving models that include dependent model(s), and requests 670 are related to requests involving standalone models (e.g., models without dependent models). A machine learning model with one or more dependent models may perform a requested job (e.g., a prediction that includes multiple tasks or operations) in conjunction with one or more of such dependent models that each may perform a sub-task(s) from the requested job. In comparison, a standalone model may perform all of the tasks from a given requested job. A given request as discussed above may include an identifier for requesting a corresponding machine learning model that is provided by a particular prediction service as discussed before. Although not illustrated, in some instances, router service 654 may receive such requests from service mesh 656.

In an embodiment, service mesh 656 can provide access to a particular service mesh client (e.g., service mesh client 615, service mesh client 625, service mesh client 635, service mesh client 645) that is included in each pod of each cluster in FIG. 6. Each service mesh client can determine where to forward a given request (e.g., request 660, request 670) to a particular machine learning model deployed by a particular prediction service. In an example, a given request (e.g., request 660 or request 670) can include information identifying the machine learning model that is to perform the machine learning operation. Such identifying information can include, for example, a model tag (e.g., "model.A") corresponding to a particular model and a model identifier (e.g., "predict-model.A.service.envoy.XYZ" where XYZ can refer to a method or operation to perform by the model).

In the example of FIG. 6, a particular prediction service can request container service 658 to deploy a new instance of a machine learning model from a container image. In some embodiments, container service 658 can provide a container platform (Kubernetes®, and the like) to perform operations to deploy machine learning models onto a given prediction service. Such a container platform is enabled to manage and deploy instances of machine learning models in respective container environments (e.g., pods or containers). Further, as shown, container service 658 can be implemented as a separate process or service outside of a given cluster or does not run within a container, or instead runs within a different environment such as a separate server, a sandbox environment, within a virtual machine, and the like.

As discussed further herein, a given request can include information for a model tag and at least one operation (e.g., a request job including one or more tasks and sub-tasks) for a model, corresponding to the model tag, to perform (e.g., a prediction, and the like). In an embodiment, after receiving a request, router service 654 can proxy the request through a network mesh layer (e.g., provided by service mesh 656) so that the request is directly sent to the appropriate prediction service.

As discussed further below in the following discussion, components of system 600 (e.g., router service 654) can handle requests for machine learning models, and route such requests to a corresponding pod/container based on information included in the requests (e.g., model tag). Moreover, as explained herein, a prediction service can initiate deployment of a new version of a machine learning model(s) (e.g., either a standalone model, or a model with a set of dependent models) by communicating with container service 658, which in turns facilitates deployment of the new version of the model through communications with a container platform.

FIG. 7 is a flow diagram illustrating a method 700, in accordance with some embodiments of the present disclosure. The method 700 may be embodied in computer-readable instructions for execution by one or more hardware components (e.g., one or more processors) such that the operations of the method 700 may be performed by components of system 600. Accordingly, the method 700 is described below, by way of example with reference thereto. However, it shall be appreciated that the method 700 may be deployed on various other hardware configurations and is not intended to be limited to deployment within system 600.

At operation 702, router service 654 receives a first request to deploy a first machine learning model. In an implementation, the first request includes information indicating an identifier associated with the first machine learning model.

At operation 704, the router service 654 determines, based at least in part on the first machine learning model, a set of dependent machine learning models. In an embodiment, a prediction service image includes a compiled application with all of its library dependencies, and a model package includes its own model dependencies.

At operation 706, container service 658 selects a first container environment to deploy the first machine learning model and the set of dependent machine learning models. In an implementation, the first request includes information indicating a model tag corresponding to the first machine learning model and selecting the first container environment is based at least in part on the model tag.

By way of example, container service 658 can select the first container environment based at least in part on container configuration information stored in container configuration 688. In particular, such container configuration information can specify a set of computing resources (e.g., storage, memory, network, latency, and the like) needed to deploy an instance of the machine learning model, and container service 658, working in conjunction with a container platform, identifies a particular cluster (e.g., cluster 602 or cluster 604) for deploying the instance of the application and associated machine learning models included therein.

In an embodiment, the first container environment comprises a cluster (e.g., cluster 602 or cluster 604), the cluster including at least one computing node, the at least one computing node comprises at least one pod, and the instance of the application executes in the at least one pod.

At operation 708, container service 658, based on the selected first container environment, executes an instance of an application in the selected first container environment, the first machine learning model and the set of dependent machine learning models being deployed as part of the instance of the application. In an implementation, a container platform stores the first machine learning model and the set of dependent machine learning models into volatile memory provided by the selected first container environment, and the volatile memory comprises a cache associated with the selected first container environment.

FIG. 8 is a flow diagram illustrating a method 800 for processing a request for training a machine learning model in a container platform, in accordance with some embodiments of the present disclosure. The method 800 may be embodied in computer-readable instructions for execution by one or more hardware components (e.g., one or more processors) such that the operations of the method 800 may be performed by components of system 600. Accordingly, the method 800 is described below, by way of example with reference thereto. However, it shall be appreciated that the method 800 may be deployed on various other hardware configurations and is not intended to be limited to deployment within system 600.

At operation 802, router service 654 generates a first identifier associated with the first machine learning model, the first identifier indicating a particular version of the first machine learning model. In some embodiments, the router service 654 detects a unique identifier (e.g., associated with a requested job) in a given request, performs a query of a model registry (e.g., model registry 684) and determines that the model registry should be updated to include the (new) unique identifier to associate with a model tag corresponding to the first machine learning model. The router service 654, in an example, can utilize the unique identifier from the request to update the model registry, or alternatively, generate a new identifier (e.g., the aforementioned first identifier) based at least in part on the unique identifier from the request. It is appreciated that any appropriate technique can be utilized to generate the first identifier, including one or more hash functions or algorithms.

At operation 804, router service 654 updates a model registry based on the generated first identifier and the model tag to associate the first machine learning model with the first container environment where the first machine learning model is deployed. As discussed before, the first container environment can correspond to a particular cluster that hosts a particular pod (or container) including the instance of the first machine learning model.

In an implementation, the method 800 can be performed to update the model registry to reflect a new (e.g., updated) unique identifier for the first machine learning model.

FIG. 9 is a flow diagram illustrating a method 900, in accordance with some embodiments of the present disclosure. The method 900 may be embodied in computer-readable instructions for execution by one or more hardware components (e.g., one or more processors) such that the operations of the method 900 may be performed by components of system 600. Accordingly, the method 900 is described below, by way of example with reference thereto. However, it shall be appreciated that the method 900 may be deployed on various other hardware configurations and is not intended to be limited to deployment within system 600.

At operation 902, router service 654 receives a second request, the second request comprising information related to a job including at least one operation for the first machine learning model to perform. In an example, the second request includes information indicating a model tag corresponding to the first machine learning model and information indicating a unique identifier of the model that is to perform the job. Such a unique identifier can correspond to a particular version of the model.

Additionally, the first machine learning model comprises a prediction model, and the job comprises a prediction performed by the first machine learning model. In some instances, the job includes a set of tasks (or operations) where the first machine learning model can perform at least one task from the set of tasks, and one or more dependent models can perform other tasks (e.g., sub-tasks) from the sets of tasks of the job.

At operation 904, the router service 654 queries the model registry (e.g., model registry 684) to locate information related to the first machine learning model. In an example where the operation is not a model deployment request, but a prediction request(s), then router service 654 does not query model registry 684 and operation 904 is not performed.

At operation 906, router service 654 receives the information related to the first machine learning model, the information including the first identifier associated with the first machine learning model. In an example, this information can indicate the particular cluster and pod where the first machine learning model is deployed (e.g., cluster 602 and pod 610), which can be received from or determined using service mesh 656.

At operation 908, router service 654, based on the first identifier, routes the second request to the first container environment for the first machine learning model to perform the at least one operation from the job. In an example, the first container environment corresponds to pod 610 from cluster 602, and prediction service 614 receives the routed request from the router service 654.

At operation 910, prediction service 614 sends a third request to perform the at least one operation utilizing the first machine learning model included in the instance of the application that is executing in the first container environment. As mentioned above, the application includes the first machine learning model and set of dependent machine learning models, which can perform tasks (and sub-tasks therein) to perform the job. The first machine learning model can receive the third request and proceed to perform the at least one operation from the job (e.g., a request to perform a prediction).

In an example, the job includes a second operation. In this example, prediction service 614 sends a fourth request to perform the second operation utilizing a second machine learning model included with the set of dependent machine learning models deployed as part of the instance of the application, and prediction service 614 receives information including a particular result of performing the second operation by the second machine learning model.

At operation 912, prediction service 614 receives information including a result of performing the at least one operation (e.g., the prediction). In turn, prediction service 614 can send the information back to router service 654 which can then forward the information to the originator (e.g., client device or user, and the like) of the second request discussed above.

FIG. 10 is a flow diagram illustrating a method 1000, in accordance with some embodiments of the present disclosure. The method 1000 may be embodied in computer-readable instructions for execution by one or more hardware components (e.g., one or more processors) such that the operations of the method 1000 may be performed by components of system 600. Accordingly, the method 1000 is described below, by way of example with reference thereto. However, it shall be appreciated that the method 1000 may be deployed on various other hardware configurations and is not intended to be limited to deployment within system 600.

At operation 1002, router service 654 detects that a different instance of the first machine learning model is included in a different container environment from the first container environment, and the different instance of the first machine learning model corresponds to a previous version of the first machine learning model than the particular version of the first machine learning model included in the instance of the application executing in the first container environment. Stated another way, router service detects conflicting versions a given machine learning model and can then proceed with ceasing execution of the conflicting machine learning model (e.g., an older deployment).

At operation 1004, container service 658 ceases execution of the different container environment and the different instance of the first machine learning model. In an embodiment, container service 658 can work in conjunction with a container platform to cease the execution of the older version of the first machine learning model.

The following discussion relates to various terms and phrases that are mentioned in the disclosure.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra-book, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association—branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device. With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving a first request to deploy a first machine learning model, the first request including information indicating an identifier associated with the first machine learning model;

determining, based at least in part on the first machine learning model, a set of dependent machine learning models;

comparing computing resource requirements of the first machine learning model and the set of dependent machine learning models with available computing resources of a set of candidate clusters configured for execution of different machine learning models;

selecting, from the set of candidate clusters, a first container environment comprising at least one cluster of the set of candidate clusters to deploy the first machine learning model and the set of dependent machine learning models, wherein the selection is based on an amount of computing resources associated with this deployment; and based on the selected first container environment, executing an instance of an application in the selected first container environment, the first machine learning model and the set of dependent machine learning models being deployed as part of the instance of the application.

2. The method of claim 1, wherein the first request includes information indicating a model tag corresponding to the first machine learning model and selecting the first container environment is based at least in part on the model tag.

3. The method of claim 2, further comprising:

querying a model registry based on the model tag; and receiving information related to the model tag from the querying, the information comprising respective model tags associated with each machine learning model from the set of dependent machine learning models.

4. The method of claim 1, further comprising:

generating a first identifier associated with the first machine learning model, the first identifier indicating a particular version of the first machine learning model based at least in part on the identifier included in the first request; and updating a model registry based on the generated first identifier and a model tag to associate the first machine learning model with the first container environment where the first machine learning model is deployed.

5. The method of claim 4, further comprising:

receiving a second request, the second request comprising information related to a job including at least one operation for the first machine learning model to perform;

querying the model registry to locate information related to the first machine learning model;

receiving the information related to the first machine learning model, the information including the first identifier associated with the first machine learning model;

based on the first identifier, routing the second request to the first container environment for the first machine learning model to perform the at least one operation;

sending a third request to perform the at least one operation utilizing the first machine learning model included in the instance of the application that is executing in the first container environment; and receiving information including a result of performing the at least one operation.

6. The method of claim 5, further comprising:

detecting that a different instance of the first machine learning model is included in a different container environment from the first container environment, the different instance of the first machine learning model comprising a previous version of the first machine learning model than the particular version of the first machine learning model included in the instance of the application executing in the first container environment; and ceasing execution of the different container environment and the different instance of the first machine learning model.

7. The method of claim 5, wherein the job includes a second operation and further comprising:

sending a fourth request to perform the second operation utilizing a second machine learning model included with the set of dependent machine learning models deployed as part of the instance of the application; and receiving information including a particular result of performing the second operation by the second machine learning model.

8. The method of claim 7, wherein the first machine learning model comprises a prediction model and the job includes a set of operations for a prediction to be performed by the first machine learning model, and the first machine learning model relies upon the information including the particular result of performing the second operation by the second machine learning model.

9. The method of claim 1, wherein the first container environment comprises a cluster, the cluster including at least one computing node, the at least one computing node comprises at least one pod, the instance of the application executes in the at least one pod.

10. The method of claim 1, further comprising:

storing the first machine learning model and the set of dependent machine learning models into volatile memory provided by the selected first container environment, the volatile memory comprising a cache associated with the selected first container environment.

11. A system comprising:

a network;

one or more processors; and a memory storing instructions that, when executed by at least one processor among the one or more processors, cause the at least one processor to perform operations comprising:

receiving a first request to deploy a first machine learning model, the first request including information indicating an identifier associated with the first machine learning model;

determining, based at least in part on the first machine learning model, a set of dependent machine learning models;

comparing computing resource requirements of the first machine learning model and the set of dependent machine learning models with available computing resources of a set of candidate clusters configured for execution of different machine learning models;

selecting, from a set of candidate clusters, a first container environment comprising at least one cluster of the set of candidate clusters to deploy the first machine learning model and the set of dependent machine learning models, wherein the selection is based on an amount of computing resources associated with this deployment; and based on the selected first container environment, executing an instance of an application in the selected first container environment, the first machine learning model and the set of dependent machine learning models being deployed as part of the instance of the application.

12. The system of claim 11, wherein the first request includes information indicating a model tag corresponding to the first machine learning model and selecting the first container environment is based at least in part on the model tag.

13. The system of claim 12, wherein the operations further comprise:

querying a model registry based on the model tag; and receiving information related to the model tag from the querying, the information comprising respective model tags associated with each machine learning model from the set of dependent machine learning models.

14. The system of claim 11, wherein the operations further comprise:

generating a first identifier associated with the first machine learning model, the first identifier indicating a particular version of the first machine learning model based at least in part on the identifier included in the first request; and updating a model registry based on the generated first identifier and a model tag to associate the first machine learning model with the first container environment where the first machine learning model is deployed.

15. The system of claim 14, wherein the operations further comprise:

receiving a second request, the second request comprising information related to a job including at least one operation for the first machine learning model to perform;

querying the model registry to locate information related to the first machine learning model;

receiving the information related to the first machine learning model, the information including the first identifier associated with the first machine learning model;

based on the first identifier, routing the second request to the first container environment for the first machine learning model to perform the at least one operation;

sending a third request to perform the at least one operation utilizing the first machine learning model included in the instance of the application that is executing in the first container environment; and receiving information including a result of performing the at least one operation.

16. The system of claim 15, wherein the operations further comprise:

detecting that a different instance of the first machine learning model is included in a different container environment from the first container environment, the different instance of the first machine learning model comprising a previous version of the first machine learning model than the particular version of the first machine learning model included in the instance of the application executing in the first container environment; and ceasing execution of the different container environment and the different instance of the first machine learning model.

17. The system of claim 15, wherein the job includes a second operation and wherein the operations further comprise:

sending a fourth request to perform the second operation utilizing a second machine learning model included with the set of dependent machine learning models deployed as part of the instance of the application; and receiving information including a particular result of performing the second operation by the second machine learning model.

18. The system of claim 17, wherein the first machine learning model comprises a prediction model and the job includes a set of operations for a prediction to be performed by the first machine learning model, and the first machine learning model relies upon the information including the particular result of performing the second operation by the second machine learning model.

19. The system of claim 11, wherein the first container environment comprises a cluster, the cluster including at least one computing node, the at least one computing node comprises at least one pod, the instance of the application executes in the at least one pod.

20. A non-transitory machine-readable medium comprising instructions which, when read by a machine, cause the machine to perform operations comprising:

receiving a first request to deploy a first machine learning model, the first request including information indicating an identifier associated with the first machine learning model;

determining, based at least in part on the first machine learning model, a set of dependent machine learning models;

comparing computing resource requirements of the first machine learning model and the set of dependent machine learning models with available computing resources of a set of candidate clusters configured for execution of different machine learning models;

selecting, from a set of candidate clusters, a first container environment comprising at least one cluster of the set of candidate clusters to deploy the first machine learning model and the set of dependent machine learning models, wherein the selection is based on an amount of computing resources associated with this deployment; and based on the selected first container environment, executing an instance of an application in the selected first container environment, the first machine learning model and the set of dependent machine learning models being deployed as part of the instance of the application.

\* \* \* \* \*